United States Patent
Moradi et al.

(10) Patent No.: US 12,140,108 B1
(45) Date of Patent: Nov. 12, 2024

(54) DETONATION OF UN-DECOMPOSED LIQUID OXIDIZER IN A ROCKET ENGINE

(71) Applicant: VENUS AEROSPACE CORP, Houston, TX (US)

(72) Inventors: Ali Moradi, Houston, TX (US); Hannah McCallum, Houston, TX (US); William Thomas Ross, Houston, TX (US); Vishal Doshi, Houston, TX (US); Eric Wernimont, Houston, TX (US); Andrew Duggleby, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 0 days.

(21) Appl. No.: 18/365,767

(22) Filed: Aug. 4, 2023

(51) Int. Cl.
*F02K 9/95* (2006.01)
*F02K 9/42* (2006.01)
*F02K 9/68* (2006.01)

(52) U.S. Cl.
CPC ............. *F02K 9/95* (2013.01); *F02K 9/425* (2013.01); *F02K 9/68* (2013.01)

(58) Field of Classification Search
CPC ............. F02K 9/425; F02K 9/68; F02K 9/95
See application file for complete search history.

(56) References Cited

U.S. PATENT DOCUMENTS

| | | | | |
|---|---|---|---|---|
| 3,240,010 A | * | 3/1966 | Morrison | F02K 9/66 60/213 |
| 3,651,644 A | * | 3/1972 | Breen | F02K 9/95 422/186.04 |

(Continued)

FOREIGN PATENT DOCUMENTS

| | | | | |
|---|---|---|---|---|
| CN | 203604065 | 5/2014 | ............... | F02K 9/64 |
| CN | 103993984 | 8/2014 | ............... | F02K 9/95 |
| CN | 112177801 | 1/2021 | ............... | F02K 9/68 |

OTHER PUBLICATIONS

Guseinov, Sh. L., Hydrogen Peroxide Decomposition Catalysts Used in Rocket Engines, 2020, Russian Journal of Applied Chemistry, p. 467 (Year: 2020).*

(Continued)

*Primary Examiner* — Kyle Robert Thomas
(74) *Attorney, Agent, or Firm* — HAYES SOLOWAY P.C.

(57) ABSTRACT

Disclosed is a method for initiating startup of a rocket engine configured to run on a liquid fuel and liquid hydrogen peroxide, including the steps of: initially decomposing the liquid hydrogen peroxide by passing the liquid hydrogen peroxide through a catalyst bed; passing decomposition products from the catalyst bed to a reaction chamber of the rocket engine and mixing the decomposition products with the liquid fuel to initiate detonation. Once detonation is initiated, the liquid $H_2O_2$ and liquid fuel are passed directly to a reaction chamber of the rocket, bypassing the catalyst bed. A rocket system includes a rocket engine having an initial ignition circuit having a catalyst bed sized to support decomposition of liquid $H_2O_2$ for initial reaction with the liquid fuel. The rocket engine, upon initial ignition, is configured to run on liquid fuel and liquid $H_2O_2$ without first passing the liquid $H_2O_2$ through the catalyst bed.

9 Claims, 3 Drawing Sheets

(56) References Cited

U.S. PATENT DOCUMENTS

| | | | | |
|---|---|---|---|---|
| 6,272,846 | B1* | 8/2001 | Schneider | C06B 47/06 |
| | | | | 60/39.822 |
| 9,598,323 | B2* | 3/2017 | Sackheim | F02C 7/22 |
| 10,364,151 | B2 | 7/2019 | Wynn et al. | C06B 47/00 |
| 2008/0264372 | A1* | 10/2008 | Sisk | F02K 9/42 |
| | | | | 123/146.5 R |
| 2009/0007541 | A1* | 1/2009 | Kawaguchi | F02K 9/425 |
| | | | | 60/220 |
| 2015/0128597 | A1* | 5/2015 | Schlak | B60K 5/08 |
| | | | | 60/719 |
| 2015/0251766 | A1* | 9/2015 | Atkey | F25B 27/00 |
| | | | | 60/785 |
| 2015/0330869 | A1* | 11/2015 | Ziarno | G01M 15/14 |
| | | | | 701/34.4 |
| 2016/0076461 | A1* | 3/2016 | Kawai | B64D 37/30 |
| | | | | 60/39.463 |

OTHER PUBLICATIONS

Wessel, "How Rocket Engines Ignite", Headed For Space website, https://headedforspace.com/how-rocket-engines-ignite/ , accessed May 10, 2023, 7 pgs.

"JP-8", https://en.wikipedia.org/w/index.php?title=JP-8&oldid=1143819913 , accessed May 10, 3 pgs.

* cited by examiner

DETONATION OF UN-DECOMPOSED LIQUID OXIDIZER IN A ROCKET ENGINE

FIELD OF THE DISCLOSURE

The present disclosure relates to rocket engines and, more particularly, to ignition and operation of rocket engines on liquid fuels and liquid oxidizers. The disclosure has particular utility in connection with the ignition and operation of rotating detonation rocket engines (RDREs) on liquid fuels and liquid oxidizers, and will be described in connection with such utility, although other utilities are contemplated.

BACKGROUND AND SUMMARY

Rotating Detonation Rocket Engines (RDREs) are engines using a form of pressure gain combustion based on a detonation wave traveling around an annular reaction chamber or reaction channel or annulus. In detonative combustion, the process achieves supersonic flow to provide propulsion. RDREs are more efficient than conventional deflagrative combustion rocket engines, achieving a higher specific impulse.

In operation, a fuel and a heated oxidizer are injected into the reaction channel, normally through small holes or slits, and detonation is initiated in the fuel/oxidizer mixture by an igniter. After the engine is started, detonation of the fuel/oxidizer mixture is self-sustaining. That is to say, once deflagration ignites the fuel/oxidizer mixture, the energy released sustains the detonations or detonation wavefront in subsequent order. The products of detonation combustion expand out of the reaction channel and are further pushed out of the reaction channel by incoming fuel and oxidizer, resulting in a propelling force capable of driving an aircraft or rocket at supersonic or hypersonic speed.

Fuels and oxidizers currently used with rocket engines must be stored separately from one another and have limited storage lives.

Also, many liquid rocket fuels such as liquid hydrogen or liquid methane must be stored at low temperature. Similarly, liquid oxygen requires continuous refrigeration. Solid oxidizers and fuels, including ammonium perchlorate (AP), ammonium dinitramide (AND), ammonium nitrate (AN), ammonia borane, and hydrazinium nitroformate (HNF), are incompatible with rocket engines that can be stopped and restarted. Liquid oxygen is inherently incompatible with wooden rounds, or storage and use without additional fueling or ongoing servicing. Several of the commonly used oxidizers mentioned above are polluting. Hydrogen peroxide has an advantage in being an inherently "green" chemical. Catalytic decomposition of hydrogen peroxide releases 2.877 MJ of energy per 1 kg of hydrogen peroxide and produces green products according to the following reaction:

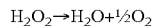

This reaction leads to generation of superheated water steam and oxygen. Mass-wise, 47% of the decomposition reaction products of hydrogen peroxide is molecular oxygen, which makes its high oxygen concentration efficient for use as an oxidizer for various rocket fuels.

However, $H_2O_2$ must be decomposed before it can be used as an oxidizer. Heretofore, $H_2O_2$ has been decomposed on a catalyst bed sized to support full flow decomposition of the $H_2O_2$ during flight. However, a catalyst bed sized to support decomposition of the $H_2O_2$ during flight adds significant mass and volume to a rocket.

In accordance with the present disclosure, we provide a rocket configured to run on a fuel that is liquid at ambient temperature and on liquid hydrogen peroxide oxidizer which overcomes the aforesaid problems of the prior art. In accordance with the present disclosure, we provide a rocket engine configured to operate on liquid fuel and liquid $H_2O_2$ without the need for a catalyst bed to support decomposition of the $H_2O_2$ during continuous operation of the rocket engine following initial ignition. In one aspect of the disclosure, we provide a small catalyst bed to provide hot, decomposed $H_2O_2$ to achieve initial ignition. Once ignition is achieved, the catalyst bed is bypassed, and the liquid $H_2O_2$ and liquid fuel are delivered directly to the rocket reaction chamber. Typically, commercially-available hydrogen peroxide includes some percentage of water along with the hydrogen peroxide. It is common to refer to these hydrogen peroxide and water solutions as "hydrogen peroxide".

In another embodiment of the present disclosure, we provide an RDRE configured to operate on liquid fuel and liquid $H_2O_2$ having a small $H_2O_2$ start up catalyst bed, configured to deliver high-temperature decomposition products of $H_2O_2$, i.e., oxygen, superheated water steam, and hydroxyl radicals, into the combustion channel as an initiator to ignite the liquid fuel which is separately delivered to the reaction chamber. Once combustion is initiated, the startup catalyst bed is taken offline, and liquid $H_2O_2$ and liquid fuel are delivered directly to the reaction chamber where the liquid $H_2O_2$ undergoes decomposition in the high-temperature, high-pressure conditions in the reaction chamber and reacts with the fuel.

In yet another aspect of the disclosure, we feed decomposed $H_2O_2$ from a small $H_2O_2$ startup catalyst bed and mixture of a low molecular-weight fuel, such as propane or a hypergolic fuel, and a conventional liquid rocket fuel to a predetonation tube to achieve initial ignition. Once ignition is achieved, the catalyst bed and predetonation tube are taken offline, and we transition the fuel feed to the conventional liquid rocket fuel and deliver the conventional liquid rocket fuel and the liquid $H_2O_2$ directly to the reaction chamber.

In one embodiment, the liquid fuel comprises a conventional liquid hydrocarbon fuel such as kerosene, RP-1 (Rocket Propellant 1), or JP-8 (Jet Propellant 8).

In yet another embodiment, the initiator comprises a hypergolic ignitor, such as a borane-based fuel (such as ammonium borane, diborane, pentaborane, or triethylborane) or an ether such as diethylether, or tetrahydrofuran (THF).

In still another embodiment, the rocket engine is an RDRE.

More particularly, in another aspect we provide a method for initiating startup of a rocket engine configured to run on a liquid fuel and liquid hydrogen peroxide, comprising the steps of: (a) initially decomposing the liquid hydrogen peroxide by passing the liquid hydrogen peroxide through a catalyst bed; (b) passing decomposition products from the catalyst bed to a reaction chamber of the rocket engine and mixing the decomposition products with the liquid fuel to initiate detonation; and (c) once detonation is initiated, passing the liquid hydrogen peroxide and liquid fuel directly to a reaction chamber of a rocket, bypassing the catalyst bed.

In one aspect, the catalyst bed is configured and of a size below that required for continuous operation of the rocket.

In another aspect, the decomposition products and the liquid fuel are initially passed to a predetonation tube, where reaction initiation takes place, and the products of reaction from the predetonation tube is passed to the reaction chamber of the rocket.

In a further aspect, a low molecular-weight fuel such as propane is also introduced into the predetonation tube.

In another aspect the propane is introduced into the predetonation tube as a slug of propane.

In another aspect, the fuel comprises JP-8 or RP-1.

In a further aspect, at least some of the fuel comprises a hypergolic fuel.

In yet another aspect, the rocket engine comprises a rotating detonation rocket engine (RDRE).

The present disclosure also provides a rocket system comprising a rocket engine configured to run on liquid fuel and liquid hydrogen peroxide, said rocket system comprising an initial ignition circuit having a catalyst bed configured and sized to support decomposition of the liquid $H_2O_2$ for initial reaction with the liquid fuel, wherein the rocket engine, upon initial ignition, is configured to run on liquid fuel and liquid $H_2O_2$ directly without first passing the liquid $H_2O_2$ through the catalyst bed.

In one aspect, the catalyst bed is configured and of a size below that required for continuous operation of the rocket engine.

In another aspect, the rocket system further comprises a predetonation chamber interposed between the catalyst bed and a main reaction chamber of the rocket engine, wherein decomposition products from the catalyst bed and the fuel are initially reacted in the predetonation tube.

In a further aspect, the rocket engine comprises a rotating detonation rocket engine (RDRE).

The present disclosure also provides a method for ignition and operation of a rocket engine configured to run on liquid fuel and liquid oxidizer, where the liquid oxidizer comprises liquid $H_2O_2$, comprising the steps of: (a) initially decomposing the liquid $H_2O_2$ into oxygen and superheated water steam, and delivering the oxygen and superheated water steam decomposition products to a reaction chamber of the rocket engine, wherein the decomposition products are mixed with rocket fuel to initiate detonation; and (b) once detonation is initiated, delivering liquid $H_2O_2$ directly to the reaction chamber of the rocket engine, bypassing the catalyst bed.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the present disclosure will be seen from the following description, taken in connection with the accompanying drawings, wherein.

DETAILED DESCRIPTION OF THE DISCLOSURE

Figure 1:
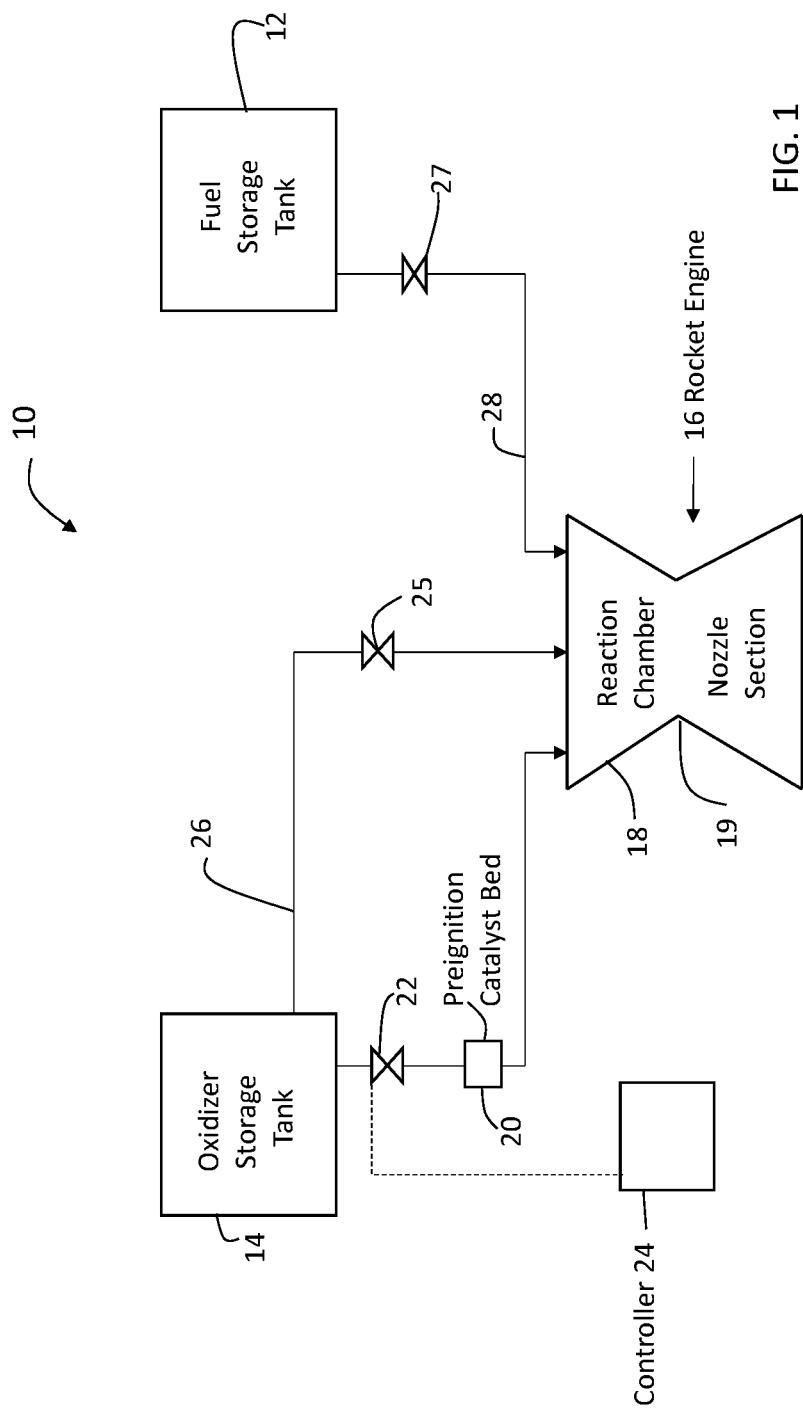
FIG. 1 is a schematic depiction of a rocket engine in accordance with a first embodiment of our disclosure.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, "conventional liquid rocket fuel" shall mean any fuel that is liquid at ambient temperature and pressure, such as JP-8 (Jet Propellant 8) or RP-1 (Rocket Propellant 1) grades of kerosene which are given as exemplary. Some other useful liquid rocket fuels that are easy to ignite include pentaborane, cyclopentane, cyclobutane, tetrahydrofuran, and diethyl ether. Low molecular-weight fuel shall mean any $C_2$-$C_6$ hydrocarbon or low molecular-weight alcohol, ether, or ester. And liquid fuel shall mean any rocket propellant that is liquid at ambient temperature and pressure, such as kerosene, methanol, gasoline, or the like.

Referring to FIG. 1, there is illustrated a rocket system 10 in accordance with one embodiment of our disclosure. Rocket system 10 comprises a storage tank 12, configured for storing a liquid fuel such as a higher molecular-weight hydrocarbon such as JP-8, and an oxidizer storage tank 14 configured for storing liquid $H_2O_2$. Rocket system 10 includes a rocket engine 16 which has a reaction chamber or combustion chamber 18 where the fuel and oxidizer are ignited and expand out of the reaction chamber through a nozzle section 19, propelling the rocket forward. A small preignition catalyst bed 20 is provided between the liquid $H_2O_2$ oxidizer storage tank 14 and the rocket reaction chamber 18. Flow of liquid $H_2O_2$ through catalyst bed 20 is controlled by valve 22 which is under control of a controller 24.

In startup, liquid $H_2O_2$ is passed from oxidizer storage tank 14 through catalyst bed 20 where the $H_2O_2$ is decomposed into oxygen and superheated water steam. The decomposed oxygen and superheated water steam are then passed to rocket reaction chamber 18 where they are mixed with fuel delivered from tank 12 to achieve initial combustion. Once initial combustion is achieved, valve 22 is closed and liquid $H_2O_2$ is routed directly to the reaction chamber 18 via valve 25 and line 26, where the $H_2O_2$ decomposes under the elevated temperature and pressure conditions in reaction chamber 18 and reacts with the liquid fuel from tank 12 which is supplied via valve 27 and line 28. The reaction continues as long as fuel and liquid $H_2O_2$ are supplied to the reaction chamber 18. Rocket system 10 also includes pumps, conduits, valves, controls, etc., (not shown), which are conventional and well known to those skilled in the art of rocket engines.

Figure 2:
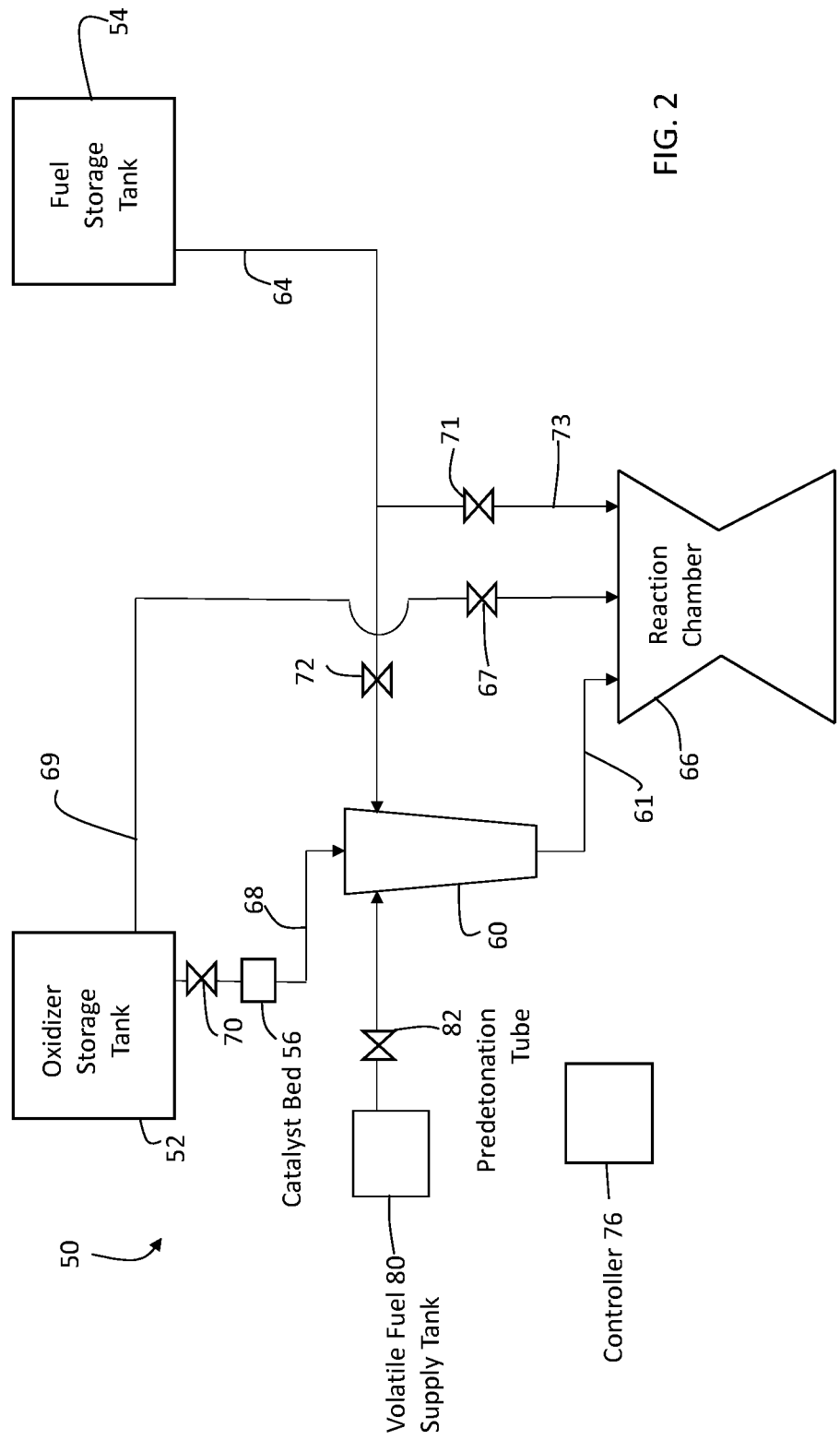
FIG. 2 is a schematic depiction of a rocket engine in accordance with a second embodiment of our disclosure.

Referring to FIG. 2, an alternative embodiment of a rocket system 50 includes a storage tank 52 for liquid $H_2O_2$ and a storage tank 54 for liquid hydrocarbon fuel. However, in this embodiment, the liquid $H_2O_2$ is initially passed through a small catalyst bed 56, where the $H_2O_2$ is decomposed into oxygen and superheated water steam and the decomposition products are then passed via conduit 68 to a predetonation tube 60, where the decomposed $H_2O_2$ decomposition products are mixed with hydrocarbon fuel delivered via conduit 64. Once ignition is achieved within the predetonation tube 60 and the hot gas products are passed to the reaction chamber 66, flow of liquid $H_2O_2$ through catalyst bed 56 is discontinued by closing valve 70, and flow of hydrocarbon fuel to predetonation tube 60 is discontinued by closing valve 72, and flow of liquid $H_2O_2$ and fuel is directed into reaction chamber 66 via valve 67 and conduit 69 and valve 71 and conduit 73 where the liquid $H_2O_2$ is decomposed under the elevated temperature and pressure conditions in reaction chamber 66, and reaction continues as long as $H_2O_2$ and fuel are supplied to reaction chamber 66. Valves 67, 70, 71 and 72 are controlled by controller 76. As in the case of the FIG. 1 embodiment, the rocket system 50 of FIG. 2 also includes pumps, conduits, valves, controls, etc., (not shown) which are conventional and well known to those skilled in the art of rocket engines.

A feature and advantage of the subject disclosure is that the catalyst bed can be made quite small since it is employed only to achieve initial reaction. Once reaction is initiated, the liquid $H_2O_2$ and liquid fuel are delivered directly to the reaction chamber of the rocket, where the high-temperature and pressure conditions within the rocket reaction chamber cause the $H_2O_2$ to decompose, whereupon continuous operation of the rocket engine is achieved without the need to first decompose the $H_2O_2$ before introducing the $H_2O_2$ into the rocket reaction chamber. As a result, packaging of the oxidizer catalyst bed is significantly more efficient.

Various changes may be made in the foregoing disclosure without departing from the spirit and scope thereof. For example, referring again to FIG. 2, a low molecular-weight hydrocarbon, such as propane or other more volatile or more easily ignited fuel (i.e., as compared to the main rocket fuel), e.g., MAPP™ gas (a mixture of methylacetylene-propadiene and propane), or other unsaturated volatile fuel may be introduced from a supply tank 80 into the predetonation tube 60 along with the conventional rocket fuel to achieve initial ignition. Once initial ignition is achieved, the flow of low molecular-weight hydrocarbon to the predetonation tube 60 is discontinued by closing valve 82 together with shutting of the feed of the $H_2O_2$ and the conventional rocket fuel to the predetonation tube 60. It also is possible to initiate combustion starting with only a low molecular-weight hydrocarbon fuel or the like and decomposed $H_2O_2$.

Figure 3:
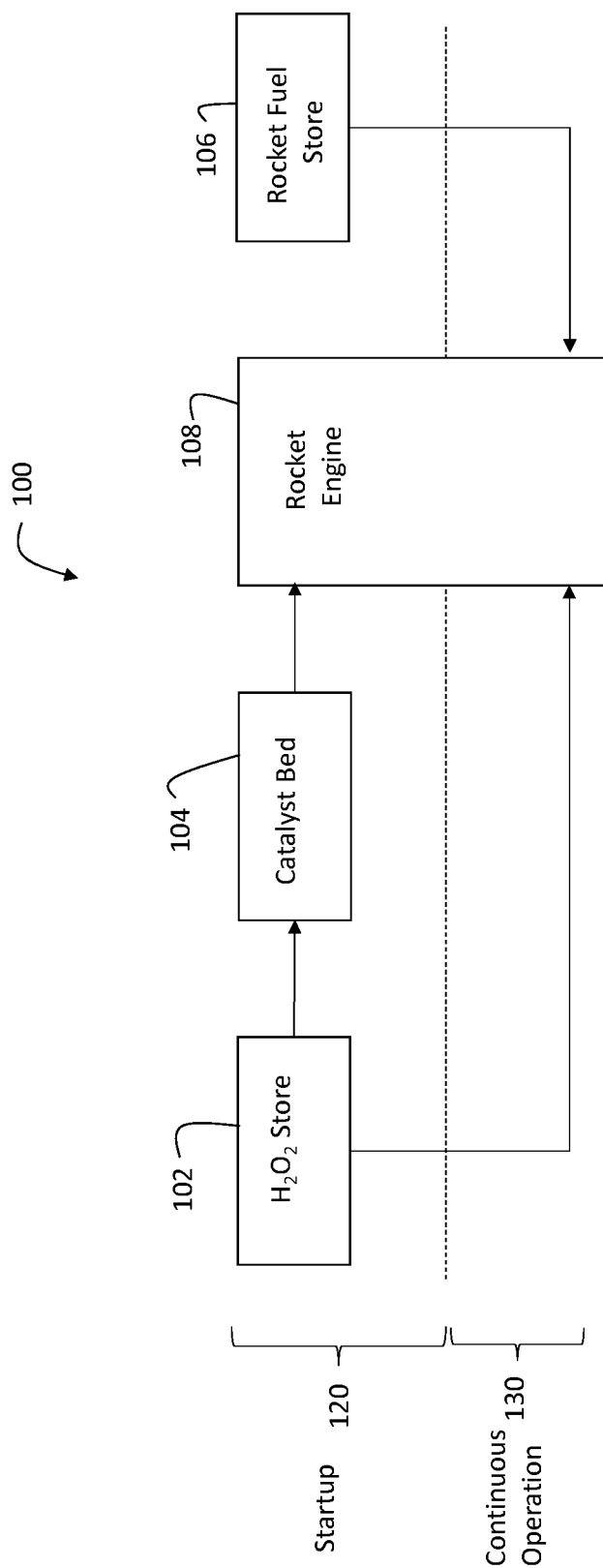
FIG. 3 is a flow diagram depicting initiation and operation of a rocket engine in accordance with the present disclosure.

FIG. 3 depicts startup and operation of a liquid fueled rocket in accordance with the present disclosure. The overall process 100 is as follows: in startup step 120, liquid hydrogen peroxide from liquid hydrogen peroxide store 102 is passed through a catalyst bed 104, where the liquid hydrogen peroxide is decomposed into oxygen and superheated water steam. Some partially-reacted hydroxyl radicals also may be formed in the decomposition step. The decomposition products from catalyst bed 104 are passed to the reaction chamber of a rocket engine 108, where the decomposed products are mixed with a liquid rocket fuel delivered from a rocket fuel store 106 to achieve initial detonation. Once initial detonation is achieved, the liquid hydrogen peroxide is passed directly to the reaction chamber of the rocket engine in step 130, bypassing the catalyst bed for continuous operation of the rocket engine.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A method for ignition and operation of a rotating detonation rocket engine (RDRE) configured to run on a liquid rocket fuel and a liquid oxidizer, where the liquid oxidizer comprises liquid $H_2O_2$, comprising the steps of:

(a) initially decomposing the liquid $H_2O_2$ into oxygen and superheated water steam by passing the liquid $H_2O_2$ through a catalyst bed and delivering the oxygen and superheated water steam decomposition products to a predetonation tube of the RDRE, wherein the decomposition products are mixed with the rocket fuel to initiate detonation; and (b) once detonation is initiated, delivering the rocket fuel and the liquid $H_2O_2$ directly to the reaction chamber of the RDRE, bypassing the catalyst bed, wherein high-temperature and pressure conditions within the rocket reaction chamber cause the $H_2O_2$ to decompose, whereupon continuous operation of the rocket engine is achieved without the need to first decompose the $H_2O_2$ before introducing the $H_2O_2$ into the RDRE reaction chamber.

2. The method of claim 1, wherein the catalyst bed is configured and of a size below that required for continuous operation of the rocket.

3. The method of claim 1, wherein the rocket fuel used to initiate detonation is comprised of a low molecular-weight fuel.

4. The method of claim 1, wherein the rocket fuel used to initiate detonation is comprised of a hypergolic fuel.

5. The method of claim 1, including the step of introducing a low molecular-weight rocket fuel into the predetonation tube during step (a), and once detonation is initiated, delivering a conventional rocket fuel and liquid $H_2O_2$ directly to the reaction chamber of the rocket engine, bypassing the catalyst.

6. The method of claim 5, wherein the low molecular-weight rocket fuel comprises propane.

7. The method of claim 6, wherein the propane is introduced into the predetonation tube as a slug of propane.

8. The method of claim 5, wherein the conventional liquid rocket fuel comprises kerosine, Jet Propellant 1 or Rocket Propellant 1.

9. The method of claim 1, wherein the rocket fuel includes a hypergolic fuel.

* * * * *